United States Patent
Hakola et al.

(10) Patent No.: US 9,344,955 B2
(45) Date of Patent: May 17, 2016

(54) APPARATUS AND METHOD FOR PEER DISCOVERY

(71) Applicant: Broadcom Corporation, Irvine, CA (US)

(72) Inventors: Sami-Jukka Hakola, Kempele (FI); Samuli Turtinen, Ii (FI); Timo K Koskela, Oulu (FI); Kaisu Maria Iisakkila, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 407 days.

(21) Appl. No.: 13/930,228

(22) Filed: Jun. 28, 2013

(65) Prior Publication Data

US 2014/0003373 A1    Jan. 2, 2014

(30) Foreign Application Priority Data

Jun. 29, 2012  (GB) .................................. 1211608.3

(51) Int. Cl.
| | |
|---|---|
| H04W 48/16 | (2009.01) |
| H04W 8/00 | (2009.01) |
| H04L 29/08 | (2006.01) |
| H04L 29/06 | (2006.01) |
| H04W 4/00 | (2009.01) |
| H04W 76/02 | (2009.01) |

(52) U.S. Cl.
CPC ............... *H04W 48/16* (2013.01); *H04L 67/16* (2013.01); *H04L 69/16* (2013.01); *H04L 69/30* (2013.01); *H04W 4/008* (2013.01); *H04W 8/005* (2013.01); *H04W 76/023* (2013.01)

(58) Field of Classification Search
CPC ..... H04W 48/16; H04W 8/005; H04W 45/00; H04W 45/02
USPC .................... 370/329, 328, 254, 255
See application file for complete search history.

(56) References Cited

U.S. PATENT DOCUMENTS

2004/0092264 A1 *  5/2004  Koodli ................... H04L 45/00
                                                          455/436

(Continued)

FOREIGN PATENT DOCUMENTS

WO     2007046597     4/2007

OTHER PUBLICATIONS

RFC4861 "Neighbor Discovery for IP Version 6 (IPv6)".

(Continued)

*Primary Examiner* — Jamal Javaid
(74) *Attorney, Agent, or Firm* — Oblon, McClelland, Maier & Neustadt, L.L.P

(57) ABSTRACT

There is provided a method, including: causing, by a second node, reception of a discovery message on a radio layer directly from a first node, wherein the discovery message indicates at least the prefix of the internet protocol, IP, address corresponding to the first node; detecting whether or not there exist an application layer connection between the first node and the second node, wherein the application layer is a higher layer than the radio layer and the detection is at least partly based on the acquired prefix; and upon detecting that the application layer connection exists, indicating the existence of the application layer connection to a network element associated with the second node.

16 Claims, 5 Drawing Sheets

(56) References Cited

U.S. PATENT DOCUMENTS

Figure 1:
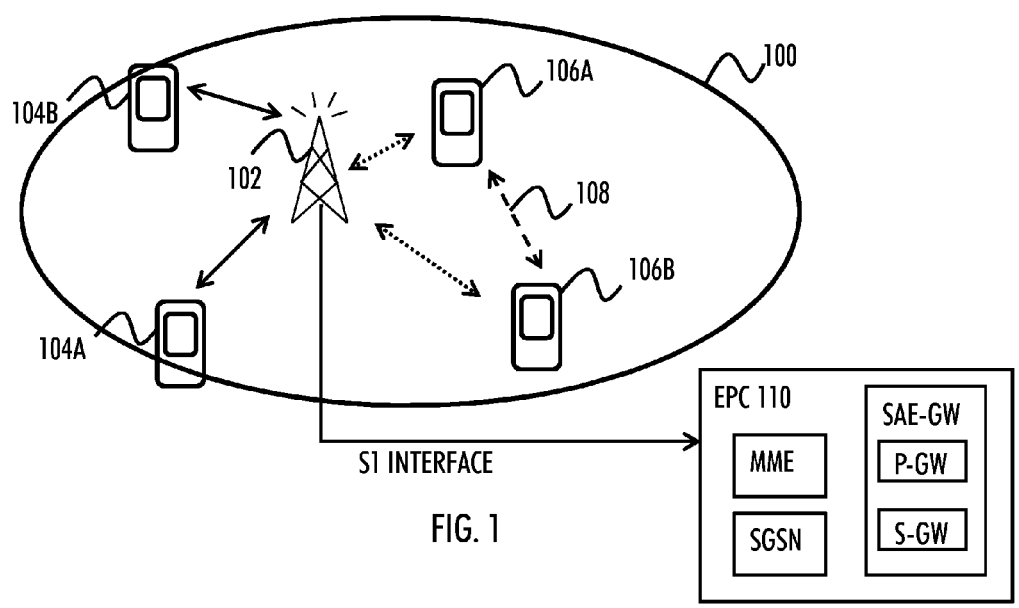

2006/0203788 A1* 9/2006 Cheon .................... H04L 45/02
370/338
2007/0141988 A1 6/2007 Kuehnel et al.
2011/0264740 A1 10/2011 Diachina et al.
2012/0129562 A1 5/2012 Stamoulis et al.

OTHER PUBLICATIONS

3GPP TS 23.401 v.11.0.0 (Dec. 2011); 3rd Generation Partnership Project; Technical Specification Group Services and System Aspects; General Packet Radio Service )GPRS) enhancements for Evolved Universal Terrestrial Radio Access Network (E-UTRAN) access (Release 11).

* cited by examiner

300 CAUSING RECEPTION OF DISCOVERY MESSAGE ON A RADIO LAYER DIRECTLY FROM A FIRST NODE, WHEREIN THE DISCOVERY MESSAGE INDICATES AT LEAST THE PREFIX OF THE IP ADDRESS CORRESPONDING TO THE FIRST NODE

302 DETECTING WHETHER OR NOT THERE EXIST AN APPLICATION LAYER CONNECTION BETWEEN THE FIRST NODE AND THE SECOND NODE, WHEREIN THE APPLICATION LAYER IS A HIGHER LAYER THAN THE RADIO LAYER AND THE DETECTION IS AT LEAST PARTLY BASED ON THE ACQUIRED PREFIX

304 UPON DETECTING THAT THE APPLICATION LAYER CONNECTION EXISTS, INDICATING THE EXISTENCE TO A NETWORK ELEMENT ASSOCIATED WITH THE SECOND NODE

FIG. 3

500 CAUSING A RECEPTION OF INFORMATION FROM A SECOND NODE, WHEREIN THE INFORMATION INDICATES THE EXISTENCE OF AN APPLICATION LAYER CONNECTION BETWEEN A FIRST NODE AND THE SECOND NODE

502 DETERMINING THE LOCATIONS OF THE FIRST NODE AND OF THE SECOND NODE

504 DETERMINING AN OPTIMIZED COMMUNICATION PATH FOR DATA TRANSMISSION BETWEEN THE FIRST NODE AND THE SECOND NODE AT LEAST PARTLY ON THE BASIS OF THE LOCATION DETECTION

506 UPON DETERMINING THAT THE OPTIMIZED COMMUNICATION PATH REQUIRES CHANGE FROM THE CURRENT COMMUNICATION PATH, ALLOCATING RESOURCES FOR THE OPTIMIZED COMMUNICATION PATH

FIG. 5

APPARATUS AND METHOD FOR PEER DISCOVERY

CROSS REFERENCE TO RELATED APPLICATIONS

This application claims priority under 35 U.S.C. §119(a) and 37 CFR 1.55 to UK patent application no. GB1211608.3, filed on Jun. 29, 2012, the entire contents of which are hereby incorporated by reference.

FIELD

The invention relates generally to mobile communication networks. More particularly, the invention relates to a peer discovery in a network applying proximity services.

BACKGROUND

It is foreseen that user terminals carried by users may apply proximity services (ProSe), such as reception and transmission of advertisements or apply the functionalities of a common application. The services may apply a direct device-to-device (D2D) communication. In order to enable such proximity services to take place, a peer discovery is needed. The peer discovery may denote discovering another device in proximity or discovering an application being running in a device in proximity, for example.

BRIEF DESCRIPTION OF THE INVENTION

According to an aspect of the invention, there is provided a method as specified in claim 1.

According to an aspect of the invention, there are provided apparatuses as specified in claims 7 and 17.

According to an aspect of the invention, there is provided a computer program product embodied on a distribution medium readable by a computer and comprising program instructions which, when loaded into an apparatus, execute the method according to any of the appended claims.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

Figure 2:
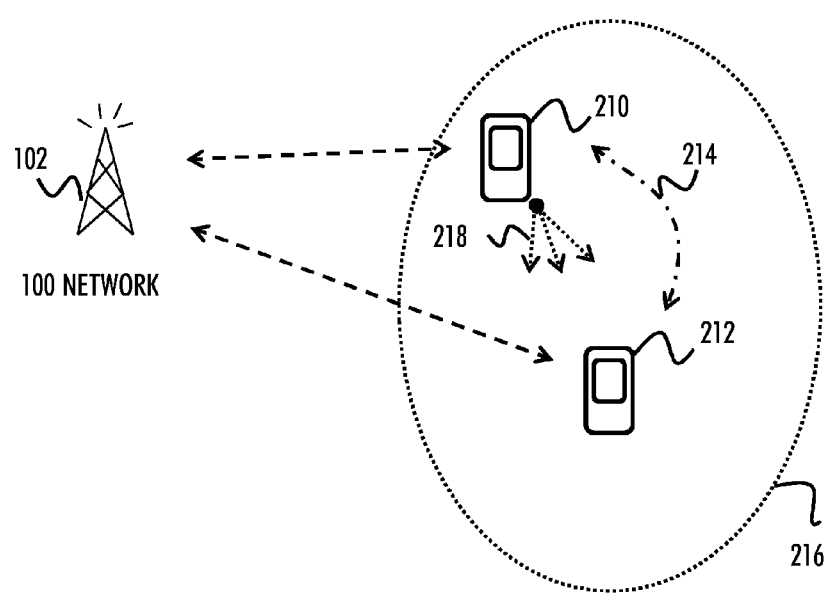
Figure 4:
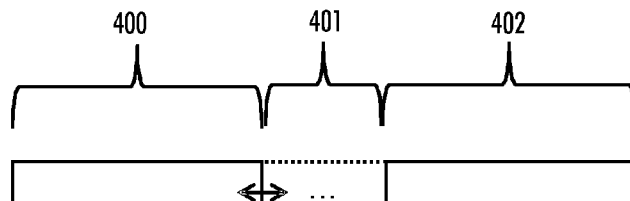
Figure 6:
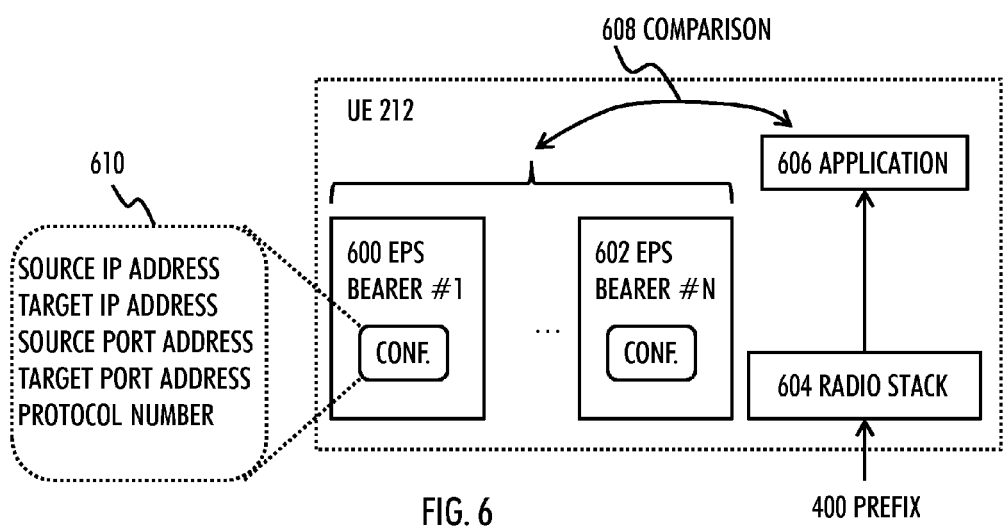
Figure 7:
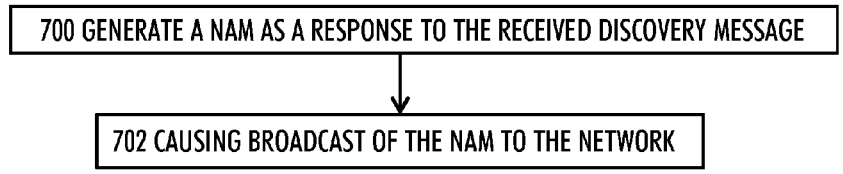
Figure 8:
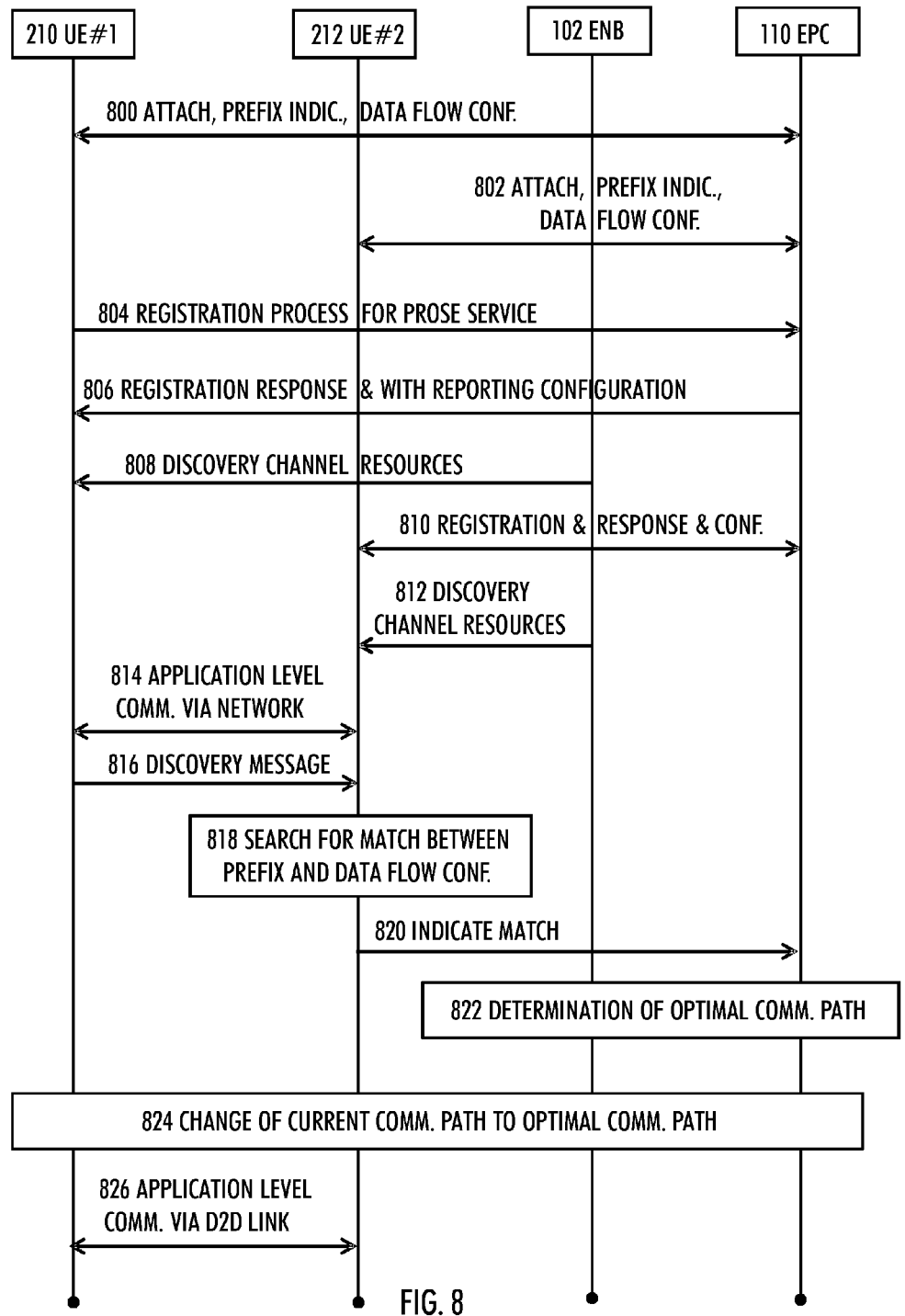
Figure 9:
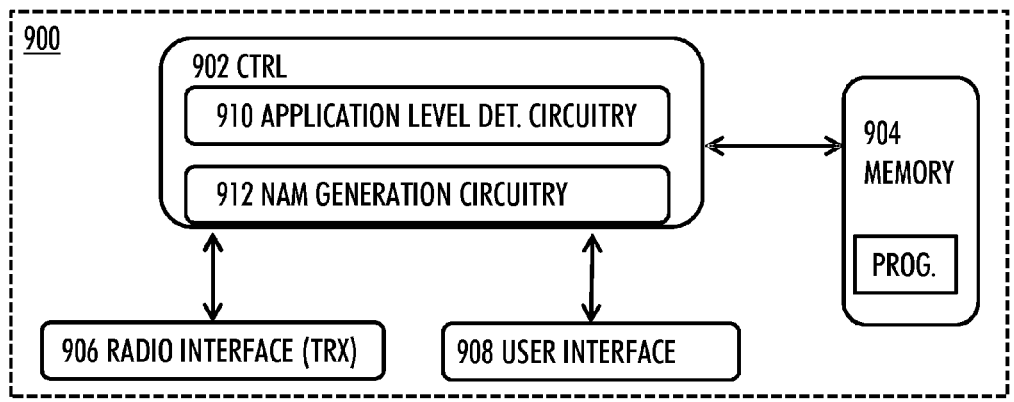
Figure 10:
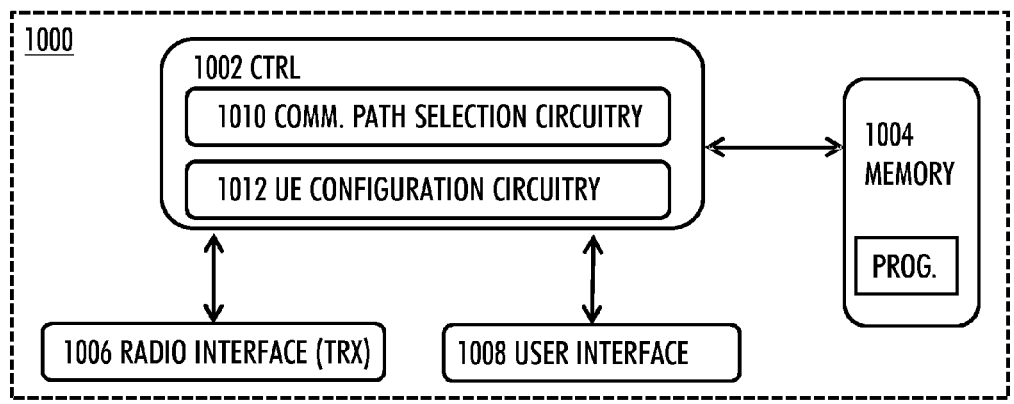

In the following, the invention will be described in greater detail with reference to the embodiments and the accompanying drawings, in which FIGS. 1 and 2 present communication scenarios according to some embodiments;

FIGS. 3, 5, 7 and 8 show methods according to some embodiments;

FIG. 4 presents an example format of an IPv6 address;

FIG. 6 illustrates how a detection of an application level communication link is performed in one embodiment; and FIGS. 9 and 10 present apparatus according to some embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the $3^{rd}$ Generation Partnership Project (3GPP), are typically composed of at least one base station (also called a base transceiver station, a radio network controller, a Node B, or an evolved Node B, for example), at least one user equipment (UE) (also called a user terminal, terminal device or a mobile station, for example) and optional network elements that provide the interconnection towards the core network. The base station or a network element may be node B (NB) as in the LTE, evolved node B (eNB) as in the LTE-A, a radio network controller (RNC) as in the UMTS, a base station controller (BSC) as in the GSM/GERAN, or any other apparatus capable of controlling radio communication and managing radio resources within a cell. The base station may connect the UEs via the so-called radio interface to the network. In general, a base station may be configured to provide communication services according to at least one of the following radio access technologies (RATs): Worldwide Interoperability for Microwave Access (WiMAX), Global System for Mobile communications (GSM, 2G), GSM EDGE radio access Network (GERAN). General Packet Radio Service (GRPS). Universal Mobile Telecommunication System (UMTS, 3G) based on basic widebandcode division multiple access (W-CDMA), high-speed packet access (HSPA), LTE, and/or LTE-A. The present embodiments are not, however, limited to these protocols.

FIG. 1 shows a communication network where embodiments of the invention may be applicable. A base station 102 may be used in order to provide radio coverage to the cell 100. For the sake of simplicity of the description, let us assume that the base station is an eNB. In the case of multiple eNBs in the communication network, the eNBs may be connected to each other with an X2 interface, as specified in the LTE. The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc. The MME together with a service GPRS (general packet radio service) support node (SGSN) may provide the control plane function for mobility between LTE and 2G/3G access networks. The SAE-GW may comprise a packet gateway (P-GW) and a service gateway (S-GW). The P-GW provides connectivity from the UE to external packet data networks (PDNs) by being the point of exit and entry of traffic for the UE. The S-GW routes and forwards user data packets, while also acting as the mobility anchor for the user plane during inter-eNodeB handovers and as the anchor for mobility between LTE and other 3GPP technologies. S-GW may also terminate the downlink data path for idle state UEs and trigger paging when downlink data arrives for the idle UE.

Still referring to FIG. 1, the eNB 102 may control a cellular radio communication links established between the eNB 102 and each of terminal devices 104A and 104B located within the cell 100. These communication links marked with solid arrows may be referred as conventional communication links or as cellular communication links for an end-to-end communication, where the source device transmits data to the destination device via the eNB 102. Therefore, the user terminals 104A and 104B may communicate with each other via the eNB 102. The terminal device may be a terminal device of a cellular communication system, e.g. a computer (PC), a sensor, a laptop, a handheld user equipment, a mobile phone, or any other user terminal (UT) or user equipment (UE) capable of communicating with the cellular communication network.

In addition to or instead of conventional communication links, direct device-to-device (D2D), also known as mobile-to-mobile (M2M), terminal-to-terminal (T2T), peer-to-peer (P2P), connections may be established among terminal devices, such as terminal devices 106A and 106B. The devices (or mobile or terminals or peers or machines) 106A and 106B having a direct physical communication link may utilize the radio resources of the cellular network, thus sharing the cellular network resources of the licensed band with other devices 104A, 104B having the conventional cellular communication to the eNB 102. Terminal devices that have established a radio resource control (RRC) connection with the eNB 102 may have their D2D communication links 108 controlled by the eNB 102 as shown with dotted arrows in FIG. 1. Thus, the eNB 102 may be responsible for allocating radio resources to the direct communication link 108 as well as for the conventional communication links. For examples, the D2D UT 106A may apply the cellular uplink (UL) and/or downlink (DL) resources in communication of data with the D2D UT 106B, and vice versa. The purpose of establishing a direct communication into the cellular network may be the possibility to reduce transmitter power and resource consumption both in the user terminals (UTs) and in the eNB 102 (or any base station), increase the cellular network resource utility and capacity, and establishing more services for the users.

Such direct D2D communication may be applied in proximity services (ProSe). One possible service type in ProSe is local advertising, where a second device 212, as shown in FIG. 2, may receive advertisements directly from the advertising device 210 through a D2D communication link 214. The applied D2D communication may refer to dedicated D2D communication links between devices or to multicast/broadcast D2D communication between one transmitter (e.g. a first device 210) and at least one recipient (such as the second device 212) without establishment of dedicated links. Another exemplary use cases may be the use of a same application, such as a peer-to-peer application, by the devices 210 and 212. When being in proximity of each other, it may make sense to apply a direct D2D link instead of forwarding data via the eNB 102.

In general, the ProSe consists of two main building blocks discovery and direct device-to-device (D2D) communication. The discovery may mean finding other interesting peers in the proximity, wherein the peer may denote applications, users, services, ProSe capable devices, etc. Therefore, pnor to applying such proximity services, the devices 210 and 212 and/or the applications running on the device 210 and 212 may need to be discovered. The device discovery may be implemented on a radio layer, also known as a physical layer or communication layer, either by using direct radio signals between the devices or by the network. For example, the discovery may take place via broadcast of a discovery message, wherein the devices may announce their communication layer identifier in their broadcasted discovery messages. However, the use of LTE identifiers, such as an IMSI (International Mobile Subscriber Identity), a GUTI (Global Unique Temporary UE Identity) and an MSISDN (Mobile Subscriber Integrated Services Digital Network Number), as the communication layer identifier, may cause security issues and additional complexity. For example, the security issue may arise when using IMSI in the broadcast messages. Therefore, in current signaling procedures, transfer of IMSI is to be avoided as much as possible by using appropriate temporary identifiers. Even though GUTI and MSISDN may not have such security issues, there is no mapping available between applications running on the devices and these candidate communication layer identifiers. As a consequence, the use of the identifiers may require a mapping server in the network side, which may cause additional signaling load between the UEs 210 and 212 and the network 100. Therefore, a solution is needed which at least partly addresses mapping the detected discovery identification to applications running on the detected devices 210 and 212 in proximity of each other.

With reference to FIG. 3, it is proposed, in step 300, that the second node 212 receives discovery message, such as identification information, on a radio layer directly from the first node 210, wherein the message indicates at least the prefix of the internet protocol, IP, address corresponding to the first node 210. Because the information is acquired directly from the first UE 210 (i.e. without routing via the eNB 102, for example), the second UE 212 may determine that the devices 210 and 212 are in proximity of each other. The proximity may denote that the devices 210 and 212 are so close to each other that they could communicate via a direct D2D link, for example. In FIG. 2, the circle 216 represents an area of proximity from the point of view of the second device 212.

The prefix of the IP address may be applied as an identifier in the discovery message. Such use of at least part of the IP address may be beneficial because mapping between the IP address and an application may exists and be available at the device 212. As an example, for communication over the network/internet 100, the used application may be identified by a transmission control protocol (TCP/IP) socket. The socket comprises information about a combination of the IP address upon which the application is running through the network 100 and the port number assigned to the application. Therefore, once the IP address, or at least the prefix, of the first device 210 is known, the existing application level link between the first device 210 and the second device 212 may be detected by the second device 212, as will be explained later. Furthermore, the IP address may be considered as a 3GPP level identifier because the IP address is assigned by the P-GW of the EPC 110 of FIG. 1 in the attach procedure of the device 212 to the network 100.

In general, any type of IP address may be applicable. It should be noted that, in an embodiment, both devices are using public IP addresses. In an embodiment, the IP address corresponds to the IPv6 IP address. In yet an embodiment, the discovery message from the first node 210 further indicates an interface identification of the IP address.

FIG. 4 depicts an example format of the IPv6 IP address. The Figure depicts the IPv6 address for unicasting or anycasting. It should be noted that, for example, the format for the multicasting may be different from the illustrated format. Regarding the terminology, it may be said that unicast identifies a single interface within the scope of the address so that IPv6 packets with unicast destination addresses are delivered to a single interface, whereas multicast identifies zero or more interfaces. IPv6 packets with multicast destination addresses are delivered to all interfaces listening on the address. The node 210/212 may be considered as a network device that may include both hosts and routers. Host may be seen as an IPv6-enabled network device which is an endpoint for IPv6 communications (either the source or destination) and may drop all traffic not explicitly addressed to it. The router may be seen as an IPv6-enabled network device that can forward IPv6 packets that are not explicitly addressed to itself.

The Internet protocol version 6 address is a numerical label that is used to identify a network interface of a computer or other network node participating in an IPv6-enabled computer network. The IP addresses serve the purpose of uniquely identifying the individual network interface(s) of a host, locating it on the network, and thus permitting the routing of IP packets between hosts. IPv6 is the successor to the IPv4. Addresses are typically composed of two logical parts: a 64-bit network prefix 400 used for routing, and a 64-bit interface identifier 402 used to identify a host's network interface. The globally unique prefix indicates the portion of the address used for routing or for identifying an address range. It should be noted that the size of the routing prefix 400 may vary so that there may also be a subnet identifier 401 in the IPv6 address within the 64 bits reserved for the prefix. The interface identifier 402 may be used for uniquely identifying the interface of the host, such as of the node 210, for example. The interface may represent a node's attachment to a link.

In an embodiment, the first device, or node, 210 may transmit the discovery message as a multicast or broadcast discovery message, as shown with arrows 218 in FIG. 2. For example, the first device 210 may construct a discovery message to be transmitted to the radio stack after the ProSe entity is enabled at first the device 210. In order to enable the ProSe entity, authentication and authorization for the proximity service may have been carried out between the UE 210 and the MME of the EPC 110. For example, after the UE 210 has been authenticated in the initial attach to the network 100, the UE 210 may request activation of the ProSe service. Then the network 100 may check the subscriber information of the UE 210 and authorize the service if the UE 210 has ProSe allowed in its subscription, for example. In an embodiment, the generated discovery message, or packet data unit (PDU), may include only the globally unique prefix of the IP address corresponding to the device 210. In another embodiment, the discovery PDU further comprises at least the interface identifier of the IP address. Thereafter, the radio of the UE 210 may be responsible to transmit the content of the discovery service data unit (SDU) based on the discovery PDU on given radio resources to the devices in the proximity.

After receiving the discovery PDU from the first node 210, the node 212 may, in step 302, detect whether or not there exist an application layer connection between the first node 210 and the second node 212, wherein the application layer is a higher layer than the radio layer and the detection is at least partly based on the acquired prefix. Thus, when the node 212 discovers the IP address of the device 210, the node 212 may check whether it has an application level communication link with the device 210. The application level connection may comprise, for example, an on-going peer-to-peer application like Skype, torrent clients, etc. The definitions of a radio layer and an application layer are clear to a skilled person from the well-known open systems interconnection (OSI) model. According to OSI model, the physical layer, i.e. the radio layer, is the lowest layer in the model and serves the layers above it, whereas the application layer (or level) is the highest one.

In an embodiment, the node 212 may detect the application level connection by comparing the acquired prefix 400 against at least one traffic flow configuration applied by the second node 212. The traffic flow configuration may comprise, for example, information related to the communication path of the on-going application level data transmission between the second device 212 and the first device 210 via the network 100. If the acquired prefix is comprised in at least one traffic flow configuration, the devices 210 and 212 may be already communicating with each other on the application level.

In an embodiment, as shown in FIG. 6, the detection is implemented at the UE 212 by checking the IP traffic flow information against the acquired prefix. As the radio stack 604 of the device 212 receives the prefix 400 of the first device 400, it may forward it to the running ProSe application 606. The UE 212 may then check whether or not the prefix 400 is comprised in at least one traffic flow configuration related to the data traffic of the ProSe service 606. This check or comparison is represented with an arrow 608 in FIG. 6. Upon detecting that the prefix is comprised in at least one traffic flow configuration, the second node 212 may determine that the application layer connection exists between the first node 210 and the second node 212.

In an embodiment, the detection is implemented at the UE 212 by checking the information of traffic flow template (TFT) filters against the discovered IP prefixes. In other words, the traffic flow configuration may correspond to a TFT of a traffic bearer 600, 602, such as an evolved packet system (EPS) bearer. The EPS bearer 600, 602 may be considered as a "virtual" connection between two endpoints. The virtual connection provides a "bearer service", i.e. a transport service with specific characteristics. For example, one EPS bearer 600 or 602 may be established when the UE 212 connects to the network 100 in order to provide the UE 212 with an IP connectivity to the network 100. This EPS bearer may be seen as the default EPS bearer. Each EPS bearer 600, 602 may have a specific traffic flow configuration (CONF in FIG. 6), such as the TFT. The TFT may be considered as a set of all packet filter associated with a given EPS bearer 600, 602, i.e. as a filter specification that describes the traffic flows in terms of IP addresses, protocols, port numbers, etc.

When the traffic flow configuration comprises the TFT information of an EPS bearer, the configuration may comprise at least one of the following: a source IP address, a target IP address, a source port number, a target port number, and a protocol number, as shown with the dotted block 610. That is, the UE 212 has knowledge of quintuple information regarding the data traffic flow of a given application 606. The information may comprise for example the source (i.e. the UE 212) and destination socket information of each application (IP address and port number). As the UE 212 detects a globally unique prefix 400 of a device 210 within proximity, the UE 212 may check whether that prefix 400 is also in one (or in multiple) quintuple information set as destination IIP address prefix or not.

Alternatively or in addition to, in an embodiment, the UE 212 may check possible mapping between socket information of active IP flows and the acquired IP prefixes 400. This embodiment may be beneficial because the default EPS bearers may not always be configured with TFT filters. The socket information may be seen as an example traffic flow configuration. The socket information may be only local in case full TFT information is not available. As an example, the socket address may represent the combination of an IP address and a port number.

In any case the UE 212 may advantageously obtain information on whether or not there already exists an on-going application level communication link with the UE 210, wherein the UE 210 locates in proximity of the UE 212. Further, the proposed solution may advantageously be built on top of the existing IPv6 protocol.

Thereafter, in step 304, the node 212 may, upon detecting that the application layer connection with the acquired IP address exists, indicate the existence of the application layer connection to the network element, such as to the eNB 102, associated with the second node 212. The association may denote that the eNB 102 provides coverage to the UE 212, for example. In practise, the node 212 may request the radio stack to indicate such event to the network 100.

In an embodiment, the second node 212 may have previously received information from the network element 102, wherein the information indicates whether or not the second node 212 is to report the existence of the application layer connection to the network element 102. The information may also carry configuration information, such as resources on which the reporting is to be done. Such information may have been acquired from the element 102 upon registration phase of a service, such as a ProSe, corresponding to the second node 212 with the network 100 at least partly controlled by the network element 102. Alternatively or in addition to, in an embodiment, such information may have been obtained as a separate activation/deactivation command from the network element 102. Such activation/deactivation commands may be acquired on a non-access stratum (NAS) level and/or, possibly in some cases, on a radio resource control (RRC) level.

The node 212 may add an indication of the prefix 400 corresponding to the first node 210 in the transmission indicating the existence of the application layer connection to the network element 102. As a result, the network element 102 may determine the identity of the first node 210 at least partly on the basis of the acquired prefix 400. This may be possible because the network element 102 may comprise knowledge of a relationship between the prefix 400 and the IMSIs of the devices in the network 100.

In an embodiment, the node 212 may add an indication of the detection quality of the discovery message in the transmission indicating the existence of the application layer connection to the network element 102. The detection quality may be beneficial when the network decides whether or not to switch to D2D communication link, for example.

In an embodiment, the discovery process is proposed to emulate sending and receiving unsolicited neighbor advertisement messages (NAM). In this example embodiment, the UE 212 may generate a NAM as a response to the received discovery message (identification information) in step 700 of FIG. 7. Thereafter, in step 702, the UE 212 may cause delivery of the NAM to an IP stack associated to the UE 212. For this embodiment, the acquired identification information in step 300 of FIG. 3 may also comprise the interface address of the IP. In practice, the UE 212 may construct the NAM corresponding to each received discovery message on the radio that is to be conveyed to the IP stack (the neighbor discovery protocol may be running in the IP stack). Then, the discovery detection results may then be transmitted to the network. It should be noted that there may be other discovery messages that are, for instance, terminated at the ProSe entity and not conveyed to the IP stack.

In an embodiment, the NAM may be an IPv6 packet including ICMPv6 (Internet Control Message Protocol version 6), which is an integral part of the IPv6 and performs, for example, error reporting, diagnostic functions (e.g., ping), etc. The ICMPv6 may be constructed to comprise for example:

source IP address, i.e. the IP address of the UE 212 which generates the NAM, destination IP address, this may be, for example, FF02::1, i.e. an all-node multicast address, ICMPv6 data
  header, such as 58 corresponding to ICMPv6,
  type=136,
  code=0.
  checksum,
  R=0 (no router capability),
  S=0 (unsolicited neighbor discovery message),
  O=1 (override flag),
  target address=(::), i.e. to all. This may alternatively be the IP address of the UE 210 acquired from the received discovery message from the radio stack.

Such embodiment where NAM is sent as a response may be advantageous in order to be able emulation of the Internet Engineering Task Force (IETF) based neighbor discovery protocol. Further by using the embodiments, the neighbor discovery may be advantageously applied also in link local domain of the 3GPP network 100. On the other hand, the embodiment without the NAM response may yield smaller discovery message sizes on radio network 100 because the reception of only the prefix may be sufficient for the detection of the application level connection.

It may also be beneficial to use the unsolicited NAM in order to enable the broadcast of the NAM. In solicited case, the NAM would be sent only as a response to specific neighbor solicitation message and targeted only to the sender of the neighbor solicitation message. Also, from the point of view of the UE 210, the neighbor solicitation would be typically targeted to a certain node in the network 100. However, the proposed unsolicited neighbor discovery may be receivable by all nodes in the network 100.

Let us look at the proposed solution from the network's element point of view with reference to FIG. 5. The network element may be the eNB 102 of FIGS. 1 and 2, or it may be another element of the network, such as the MME of EPC 110. It is proposed that the network element may in step 500 cause reception of information from the second node 212, wherein the information indicates the existence of the application layer connection between a first node 210 and the second node 212. Thereafter, the network element may determine the locations of the first node 210 and of the second node 212 in step 502. The detection of the locations may be based on available tracking area information, measured signal strengths, data from the second UE 212 and from the first UE 210, etc. In step 504, the network element may determine an optimized communication path for data transmission between the first node 210 and the second node 212 at least partly on the basis of the location detection. The network element may, for example, trigger a radio access network (RAN) level evaluation about whether or not there exists another, more optimal communication path than the current path. An example communication path may be a direct device-to-device communication link 214 of FIG. 2 between the first node 210 and the second node 212, for example. Another example communication path worth considering may comprise a local switch or locally routed data in which the packets are kept within the EUTRAN when the UEs 210 and 212 having the application level connection are served by the same eNB 102. Therefore, in step 506, upon determining that the optimized communication path requires change from the current communication path, the network node may allocate resources for the optimized communication path, such as for the D2D link 214. Thereafter, the UEs 210 and 212 may perform data communication via the optimized communication path, e.g. the D2D link 214. The allocated optimized communication path may be for all data transmission or only for the data transmissions related to the application which is running.

FIG. 9 shows a signaling flow diagram according to an embodiment. The embodiment illustrates the overall discovery process and transition from cellular communication mode to D2D mode for certain application as a result of successful over-the-air discovery. The method begins in step 800 by the attach procedure of the UE 210 to the network 100. The EPC 110 may in this step also indicate the router information including the IPv6 prefix to the UE 210. Further, the EPC 110 may set up the EPS default bearer(s) and corresponding traffic flow configurations, such as the TFT filter configuration, and indicate them to the UE 210. In step 802, similar procedures may take place with respect to the second UE 212. In step 804, the first UE 210 may perform registration process of a ProSe service with the network 100. The service may be, for example, a Skype, or a like peer-to-peer service. In step 806, the network 100 replies to the registration request. The EPC 110 of the network 100 may also indicate the UE 210 that the UE 210 is requested to report if the UE 210 detects in the proximity another device with which the UE 210 has an active application level connection with. In step 808, the RAN 102 may transmit the discovery channel resources to the UE 210 so that the UE 210 may either send a discovery message or receive one on the allocated resources. In step 810, the UE 212 performs the registration process of a ProSe service with the network. As in step 806, the network may respond to the UE 212 by indicating the configuration to report any detection of an application level communication to the network. In step 812, the UE 212 may also receive the discovery channel resources. In step 814, the devices 210 and 212 may have an active application level communication going on via the network 100, i.e. the application data is routed via at least the eNB 102. The communication may apply the configured EPS bearers, for example. However, it should be noted that such application level communication between the UEs 210 and 212 may have been set up earlier and the step 814 is simply an example point of time when such application level communication is possibly running.

In step 816, the UE 210 transmits the discovery message, i.e. the identification information, carrying at least the prefix of the IP address of the UE 210. The UE 210 may transmit such discovery messages according to a predetermined interval as configured by the network 100 or the transmission of the discovery message may be event based, wherein the event may be, for example, that the UE 210 enters to a new cell. In step 818, the UE detects whether or not there exist an application layer connection between the first UE 210 and the second UE 212 on the basis of the acquired discovery message carrying the prefix, as has been explained. When such connection is found, the UE 212 may indicate the detection to the network 100 in step 820. The indication may also carry the IP prefix of the UE 210 in order to allow the network 100 to identify the UE 210. The indication may also carry information regarding the detection quality, such as the received signal strength, of the discovery message.

As a consequence, the network 100 may, in step 822, determine whether there is a more optimal communication path possible between the two UEs 210 and 212 than the current communication path via the EPS bearer. The step 820 may include requesting the eNB 102 to perform D2D evaluation. This D2D evaluation may include transmission of sounding signals between the UEs 210 and 212, for example. If it is detected that D2D (or some other communication path) is more optimal, then the parties of the current and to-beapplied communication path may, in step 824, change their configurations accordingly. This may require transition of EPS bearers to a D2D bearer, for example. Whether the to-be-applied communication path for the application level data is more optimal than the current one or not, may depend of the efficiency, achievable data rate, required amount of transmission power, interference caused to other links, etc. There may be a predetermined set of rules for determining whether a candidate communication path is more optimal than the current one. Thereafter, in step 826, the UEs 210 and 212 may transfer the application data via the allocated resources, such as via the D2D link 214 of FIG. 2.

Embodiments, as shown in FIGS. 9 and 10, provide apparatuses 900 and 1000, each comprising a control circuitry (CTRL) 902, 1002, such as at least one processor, and at least one memory 904, 1004 including a computer program code (PROG), wherein the at least one memory 904, 1004 and the computer program code (PROG), are configured, with the at least one processor 902, 1002, to cause the corresponding apparatus 900, 1000 to carry out any one of the embodiments described. It should be noted that FIGS. 9 and 10 show only the elements and functional entities required for understanding a processing system of the apparatuses. Other components have been omitted for reasons of simplicity. It is apparent to a person skilled in the art that the apparatuses may also comprise other functions and structures.

As said, the apparatus 900/1000 may comprise a control circuitry 902/1004. e.g. a chip, a processor, a micro controller, or a combination of such circuitries causing the apparatus to perform any of the embodiments of the invention. The control circuitry 902/1002 may be implemented with a separate digital signal processor provided with suitable software embedded on a computer readable medium, or with a separate logic circuit, such as an application specific integrated circuit (ASIC). The control circuitry 902/1002 may comprise an interface, such as computer port, for providing communication capabilities. The memory 904/1004 may store software (PROG) executable by the at least one control circuitry 902/1002.

The apparatus 900/1000 may further comprise radio interface components (TRX) 906/1006 providing the apparatus with radio communication capabilities with the radio access network. The radio interface components may comprise standard well-known components such as amplifier, filter, frequency-converter, (de)modulator, and encoder/decoder circuitries and one or more antennas.

The apparatus 900/1000 may also comprise a user interface 908/1008 comprising, for example, at least one keypad, a microphone, a touch display, a display, a speaker, etc. The user interface may be used to control the apparatus 900/1000 by the user.

The apparatus 900/1000 may comprise the memory 904/1004 connected to the control circuitry 902/1004. However, memory may also be integrated to the control circuitry and, thus, no external memory may be required. The memory 904/1004 may be implemented using any suitable data storage technology, such as semiconductor based memory devices, flash memory, magnetic memory devices and systems, optical memory devices and systems, fixed memory and removable memory.

Let us first consider the apparatus 900. In an embodiment, the apparatus 900 may comprise, be comprised or be the terminal device of a cellular communication system, e.g. a computer (PC), a laptop, a tabloid computer, a cellular phone, a communicator, a smart phone, a palm computer, or any other communication apparatus. Further, the apparatus 900 may be or comprise a module (to be attached to a user terminal) providing connectivity, such as a plug-in unit, an "USB dongle", or any other kind of unit. In one example embodiment the apparatus 1000 is or is comprised in the second UE 212.

The control circuitry 902 may comprise an application level detection circuitry 910 for detecting whether or not there exists an application level connection with another device whose IP prefix is received in a discovery message, as described in any of the embodiments. The control circuitry 902 may further comprise a neighbour advertisement message (NAM) generation circuitry 912 for enabling emulation of a neighbour discovery according to an embodiment. The circuitry 912 may generate the NAM and cause transmission of the NAM to the network, for example.

Let us then consider the apparatus 1000. In an embodiment, the apparatus 1000 may comprise, be or be comprised in a base station (also called a base transceiver station, a Node B, a radio network controller, or an evolved Node B, for example). In another embodiment, the apparatus 1000 may comprise, be or be comprised in another network element such as the MME of the EPC 110. In one example embodiment the apparatus 1000 is or is comprised in the eNB 102.

The control circuitry 1002 may comprise a communication path selection circuitry 1010 for determining whether or not there exists another communication path between the UEs 210 and 212 which is more optimal than the current path, according to any of the embodiments. Upon finding such path, the circuitry 1010 may cause the communication parties to switch to using the established communication path, for example. Such reconfiguration of the UEs' communication properties may be performed by an UE configuration circuitry 1012, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configure to carry out embodiments of any of the FIGS. 1 to 10. In an embodiment, the at least one processor 902, the memory 904, and the computer program code form an embodiment of processing means for carrying out the embodiments of the invention. In another embodiment, the at least one processor 1002, the memory 1004, and the computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   causing, by a second node, reception of a discovery message on a radio layer directly from a first node, wherein the discovery message indicates at least a prefix of an internet protocol (IP) address corresponding to the first node;
   detecting whether or not there exist an application layer connection between the first node and the second node, wherein the application layer is a higher layer than a radio layer and the detection is at least partly based on the prefix; and
   upon detecting that the application layer connection exists, indicating the existence of the application layer connection to a network element associated with the second node.

2. The method of claim 1, further comprising:
   comparing the prefix against at least one traffic flow configuration applied by the second node; and upon detecting that the prefix is comprised in at least one traffic flow configuration, determining that the application layer connection exists between the first node and the second node.

3. The method of claim 1, further comprising:
causing reception of information from the network element, wherein the information indicates whether or not the second node is to report the existence of the application layer connection to the network element.

4. The method of claim 1, further comprising:
adding at least one of the following in the transmission indicating the existence of the application layer connection to the network element: an indication of the prefix corresponding to the first node, an indication of the detection quality of the discovery message.

5. The method of claim 1, further comprising:
generating a neighbor advertisement message as a response to the received discovery message; and
causing a delivery of the neighbor advertisement message to an associated IP stack.

6. The method of claim 1, further comprising:
causing a reception of information indicating a resource allocation for an optimized communication path for data transmission between the first node and the second node; and
causing data communication with the first node via the optimized communication path.

7. An apparatus, comprising:
at least one processor and at least one memory including a computer program code, wherein the at least one memory and the computer program code are configured to, with the at least one processor, cause the apparatus at least to:
cause reception of a discovery message on a radio layer directly from a first node, wherein the discovery message indicates at least a prefix of an internet protocol (IP) address corresponding to the first node;
detect whether or not there exist an application layer connection between the first node and a second node associated with the apparatus, wherein the application layer is a higher layer than a radio layer and the detection is at least partly based on the prefix; and
upon detecting that the application layer connection exists, indicate the existence of the application layer connection to a network element associated with the apparatus.

8. The apparatus of claim 7, wherein the discovery message from the first node further indicates an interface identification of the IP address and the IP address corresponds to the IPv6 IP address.

9. The apparatus of claim 7, wherein the apparatus is further caused to:
compare the prefix against at least one traffic flow configuration applied by the second node; and
upon detecting that the prefix is comprised in at least one traffic flow configuration, determine that the application layer connection exists between the first node and the second node.

10. The apparatus of claim 9, wherein a traffic flow configuration corresponds to a traffic flow template of an evolved packet system bearer and comprises at least one of the following: a source IP address, a target IP address, a source port number, a target port number, and a protocol number.

11. The apparatus of claim 7, wherein the apparatus is further caused to:
cause reception of information from the network element, wherein the information indicates whether or not the second node is to report the existence of the application layer connection to the network element.

12. The apparatus of claim 11, wherein the information is received upon registration phase of a service corresponding to the second node with the network at least partly controlled by the network element, or wherein the information is received as a separate activation/deactivation command from the network element.

13. The apparatus of claim 7, wherein the apparatus is further caused to:
add at least one of the following in the transmission indicating the existence of the application layer connection to the network element: an indication of the prefix corresponding to the first node, an indication of the detection quality of the discovery message.

14. The apparatus of claim 7, wherein the apparatus is further caused to:
generate a neighbor advertisement message as a response to the received discovery message; and
cause a delivery of the neighbor advertisement message to an associated IP stack.

15. The apparatus of claim 7, wherein the apparatus is further caused to:
cause a reception of information indicating a resource allocation for an optimized communication path for data transmission between the first node and the second node; and
cause data communication with the first node via the optimized communication path.

16. The apparatus of claim 15, wherein the optimized communication path is a direct device-to-device communication link to the first node.

* * * * *